United States Patent
Goldin et al.

(10) Patent No.: US 7,801,982 B2
(45) Date of Patent: Sep. 21, 2010

(54) CROSS SESSION PROCESS ACTION

(75) Inventors: Maxim Goldin, Redmond, WA (US);
Richard Thomas Wurdack, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1206 days.

(21) Appl. No.: 11/396,980

(22) Filed: Apr. 3, 2006

(65) Prior Publication Data

US 2007/0233856 A1    Oct. 4, 2007

(51) Int. Cl.
*G06F 15/16* (2006.01)

(52) U.S. Cl. .................................. 709/224; 709/223

(58) Field of Classification Search .............. 709/223, 709/224, 227
See application file for complete search history.

(56) References Cited

U.S. PATENT DOCUMENTS

| | | | | |
|---|---|---|---|---|
| 6,118,862 | A * | 9/2000 | Dorfman et al. | 379/201.03 |
| 6,647,423 | B2 * | 11/2003 | Regnier et al. | 709/229 |
| 6,698,016 | B1 * | 2/2004 | Ghizzoni | 717/162 |
| 2002/0056047 | A1 * | 5/2002 | Lehman | 713/200 |

OTHER PUBLICATIONS

Authors: Boris Gebhardt and Christoph Stöck Title: Introducing the next generation of ABAP debugging—the New ABAP Debugger Date: Jan./Feb. 2006 Publisher: SAP Professional Journal vol. 8 Pertinent pp. 71-98.*
CICS Application Programming Guide; Using a compiler's integrated debugging tool to debug CICS applications ; http://publib.boulder.ibm.com/infocenter/txformp/v6r0m0/topic/com.ibm.cics.te.doc/erziah (pp. 1-19), year: 2006.
Kernal Enhancements http://www.osronlone.com/ddkx/appendix/enhancements5_2e0j.htm (pp. 1-2), year: 2006.
Error: Unable to Attach to the Process. There is no Msvcmon on the Remote Machine Running Under the Current User Context http://msdn.microsoft.com/library/en-us/vsdebug/html/vxgrfErrorUnableToAttachToProcess, year: 2006.
Unable to Attach to the Process http://msdn.microsoft.com/library/en-us/vsdebug/html/zxurfUnableToAttachToProcess, year: 2006.

* cited by examiner

*Primary Examiner*—Lashonda T Jacobs
*Assistant Examiner*—Marshall McLeod
(74) *Attorney, Agent, or Firm*—Workman Nydegger

(57) ABSTRACT

Cross session process actions such as diagnostics in which a diagnostic process running in one process attaches and performs diagnostics on a process running in another session. Upon determining that diagnosis is to be performed on a process of another session, diagnostic process uses an intermediary session to launch diagnostic processes in the target session. Thus, actions such as diagnostics can be initiated across sessions.

12 Claims, 2 Drawing Sheets

CROSS SESSION PROCESS ACTION

BACKGROUND

Some computing systems have the capability to engage in multiple simultaneous sessions in which multiple users can log onto the computing system and engage in their own distinct sessions. A user session includes a set of one or more processes that are associated with that session and that will be run in the context specific to the associated user. Each user's session is partitioned such that the user is presented with a user interface that matches the configuration for that session. From the user's perspective, there may not even be any obvious indication that there are other users logged into other sessions managed by the same computing system.

In order to allow multiple users to interface with a computing system at the same time, the computing system may include multiple display and input devices. Accordingly, computing systems capable of engaging in multiple simultaneous sessions are often distributed, even though processes associated with each of the sessions may be running in a consolidated manner on a single machine. In one common configuration, a single master session may govern multiple user sessions, where the master session is devoted to administrative processes that are not specific to a given user, and where a distinct user may be logged into each user session. Due to the higher level of control desired for the master session, processes that run in the master session may typically allow more system-level functionality than do user sessions. For instance, reformatting a hard drive may be possible from a process in a master session, but not from a process in a user session.

Diagnostic tools are often used to gather data from or about a process running on the computer, and often to evaluate performance of the process based on the gathered data. When a diagnostic tool is executed, an associated process is initiated in the user session in which the diagnostic tool was launched. The diagnostic tool may then be used to evaluate processes within that same session. If evaluation of a process outside of that session is desired, the diagnostic tool typically needs to be launched in that other session. This is because the diagnostic tool gathers data by injecting code into the process being evaluated by launching a remote thread into the process under evaluation. This remote threading is typically prohibited across sessions.

It can represent a significant inconvenience for the user to launch the evaluation tool in the separate session in which the target process (i.e., the process to be evaluated) is running. Furthermore, it may not even be feasible or possible for the user to enter that other session to thereby launch the diagnostic tool in that session.

BRIEF SUMMARY

Although not required, embodiments of the present invention relate to the attaching of an attaching process in one user session to a target process in another user session. Upon the attaching process determining that an action is to be performed on a target process in another session, the attaching process causes an action process (that performs the action) to be initiated in the second session. In one embodiment, the attaching process is a diagnostics tool and the action is a diagnostic evaluation of the target process. In that case, the action process may inject diagnostic code into the target process in order to gather data for later return to the diagnostic tool. The initiation of the process in the second session may be accomplished using an intermediary session that is logically disposed as an intermediary between the two sessions that run the attaching process and the target process. Thus, an attaching process in one session may be attached to a target process in another, without having to first run the attaching process in the same session as the target process.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The appended drawings are used in order to more particularly describe embodiments of the present invention. Understanding that these drawings depict only typical embodiments of the invention and are not therefore to be considered to be limiting of its scope, the embodiments will be described and explained with additional specificity and detail through the use of the accompanying drawings in which.

DETAILED DESCRIPTION

Figure 1:
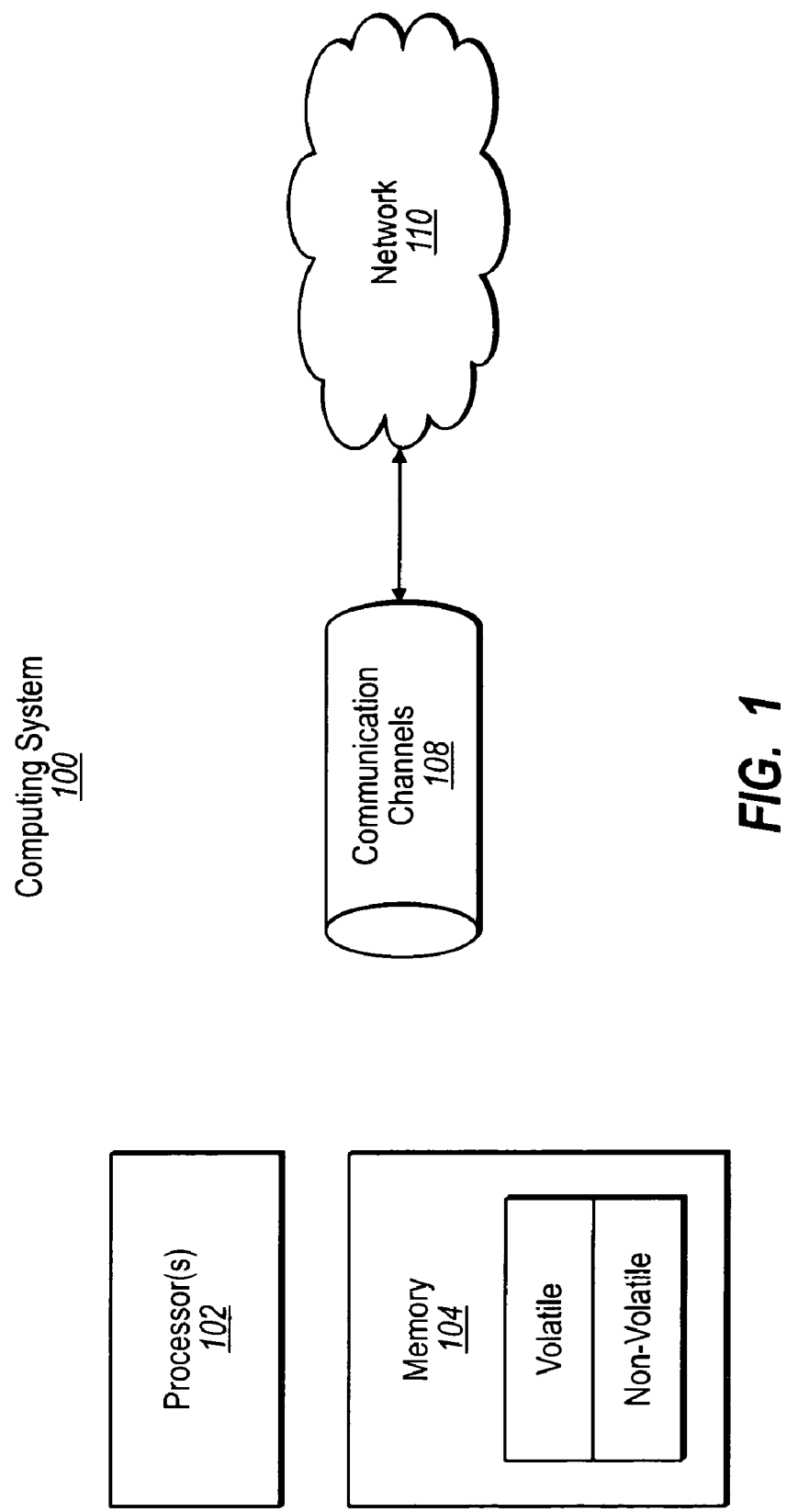
FIG. 1 illustrates a computing system in which embodiments of the principles of the present invention may operate.

Embodiment of the present invention extend to the attaching of a process such as a diagnostics tool process in one user session to a process in another user session. The embodiments of the present invention may comprise a special purpose or general-purpose computer including various computer hardware, as discussed in greater detail below. FIG. 1 shows a schematic diagram of an example computing system 100 that may be used to implement features of the present invention. The described computing system is only one example of such a suitable computing system and is not intended to suggest any limitation as to the scope of use or functionality of the invention. Neither should the invention be interpreted as having any dependency or requirement relating to any one or combination of components illustrated in FIG. 1.

Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

Referring to FIG. 1, in its most basic configuration, a computing system 100 typically includes at least one processing unit 102 and memory 104. The memory 104 may be system memory, which may be volatile, non-volatile, or some combination of the two. An example of volatile memory includes Random Access Memory (RAM). Examples of non-volatile memory include Read Only Memory (ROM), flash memory, or the like. The term "memory" may also be used herein to refer to non-volatile mass storage such as physical storage media. Such storage may be removable or non-removable, and may include (but is not limited to) PCMCIA cards, magnetic and optical disks, magnetic tape, and the like.

As used herein, the term "module" or "component" can refer to software objects or routines that execute on the computing system. The different components, modules, engines, and services described herein may be implemented as objects or processes that execute on the computing system (e.g., as separate threads). While the system and methods described herein may be implemented in software, implementations in hardware, and in combinations of software and hardware are also possible and contemplated.

In the description that follows, embodiments of the invention are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored or instantiated in the memory 104 of the computing system 100.

Computing system 100 may also contain communication channels 108 that allow the computing system 100 to communicate with other computing systems over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise either communication, as described above, or computer storage media. Computer storage media includes physical storage and/or memory media such as RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer. Computer storage media, however, does not extend to carrier waves or signals as these media are defined under communication media. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Figure 2:
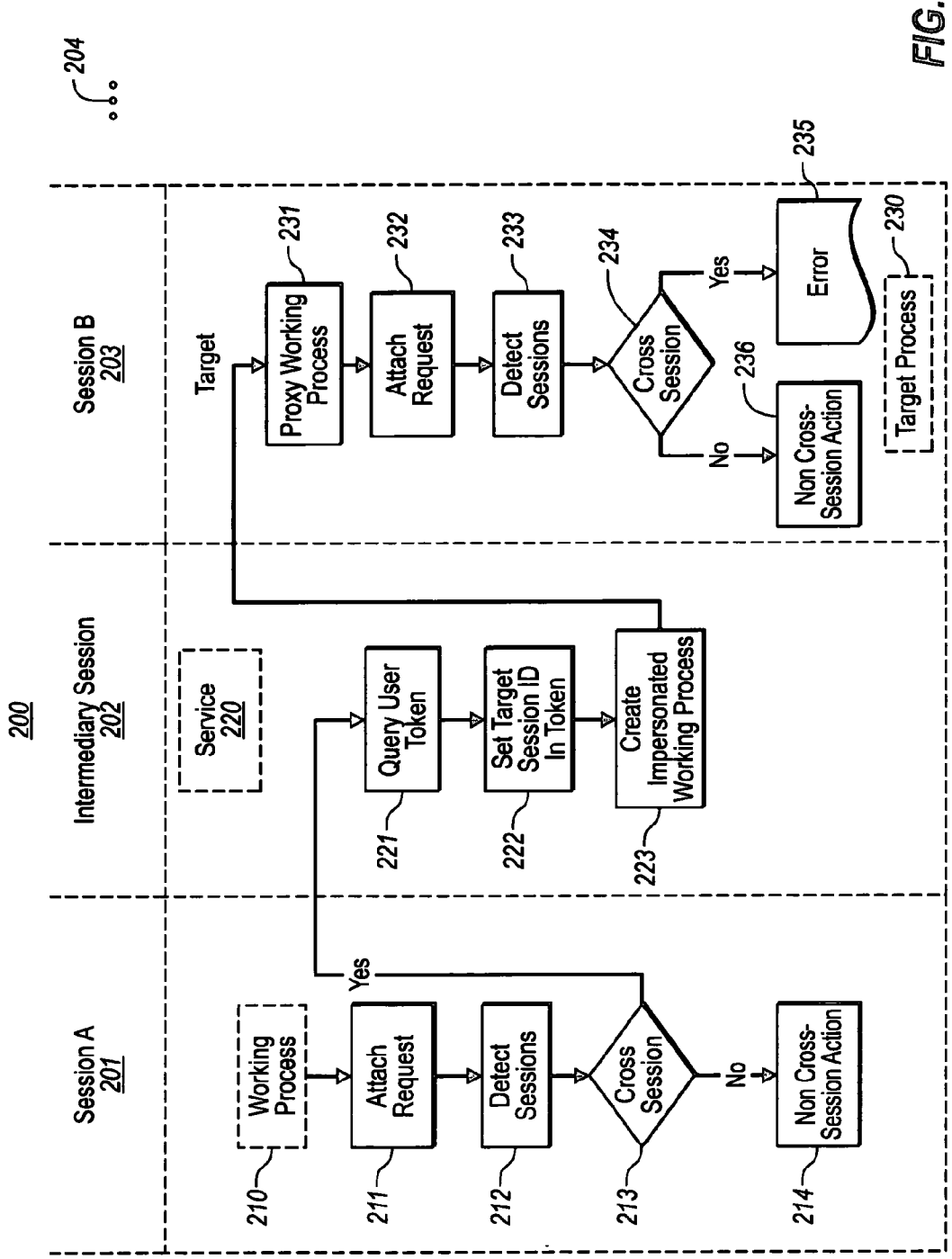
FIG. 2 illustrates a multi-session environment in which embodiments of present invention may be employed.

FIG. 2 illustrates a multi-session environment 200 in which the principles of the present invention may be implemented. The environment 200 includes at least two sessions; namely, Session A labeled as 201 and Session B labeled as 203. There may be other sessions in the multi-session environment 200 as represented by the horizontal ellipses 204. In one embodiment, an intermediary session 202 serves as an intermediary amongst Session A, Session B, and potentially other sessions 204 as well.

In the illustrated embodiment, a process 210 (hereinafter also referred to a "working process") runs within the session A. As known in the art, the term "process" refers to an entity that has its own set of resources managed by the operating system. For instance, a process may have its own process identifier, processor time slots, memory resources, and the like. In this description and in the claims, the definition of "process" is expanded somewhat to include any collection of one or more processes managed by the operating system. Thus, the working process 210, for example, may be multiple processes although not required. The working process 210 is to cause some action to be taken on a target process 230 running in session B. Once again, the target process 230 may be multiple process, although not required. In some embodiments of the present invention, the working process 210 uses a service 220 process running at the intermediary session 202 in order to facilitate the action being performed on the target process 230.

The working process 210 may be, for example, a diagnostic tool process that is to attached to the target process 230 and that potentially inject code into the target process 230. For instance, code injection may be accomplished using remote threading, or in other words, by initiating a remote thread in the target process. Conventional technology does not currently permit remote threading across sessions. Thus, allowing a process such as a diagnostic tool to inject code into a target process in another session is a unique feature enabled by embodiments of the present invention. The intermediary session 202 is used to permit this cross session attachment to thereby permit diagnostics and the like across sessions.

At some point, the working process 210 determines that an identified action is to be performed or initiated in another session. For example, if the working process 210 is a diagnostics tool process, the diagnostics tool process may access a request to perform diagnostics on the target process 230. The request to perform diagnostics may be in the form of a request to attach to the target process 230.

Referring to FIG. 2, the working process 210 may detect an attach request (act 211). The working process may then determine whether or not the target process 230 for the attach request is in the same session as the working process 210 (decision block 213). This may be accomplished by detecting the session identifiers for each of the working process 210 and the target process 230 (act 212). If the session identifiers indicate that the attachment will not be across sessions (No in decision block 213), then the attachment is performed in any manner (act 214), conventional or otherwise, that is suitable for attaching one process to another when both processes are in the same session.

The difficulty under conventional technology, however, arises when the target process 230 is in a different session than the working process 210 as is the case with FIG. 2. If it is determined that the attachments is to cross sections (Yes in decision block 213) such as is the case if the session identifiers for the working process 210 and the target process 230 are not the same, the working process 210 causes the requested action to be performed on (e.g., causes diagnostics code to be run in) the target process 230. This is not a trivial task.

In one embodiment, this is accomplished by the working process 210 opening a channel of communication with the service 220 in the intermediary session 202, if there was not one opened already. The intermediary session 202 may be, for example, a master session that permits more actions to be performed than might be allowed by merely engaging within session A or session B. For instance, intermediary session 202 may be session 0 in a multi-session environment. Mechanisms for opening communication channels between one session and another are known in the art and thus will not be described in detail herein. One conventional way of opening channels of communication across sessions is a NamedPipes Application Program Interface (API) if operating in a WINDOWS environment.

The working process 210 communicates with the service 220 that the identified action is to be performed in session B. In addition, the working process 210 informs the service 220 of an identified user of the working process 210. For instance, the working process 210 might provide a user token to the service 220 that the service may access by, for example, querying the user token (act 221). The user token may, for example, identify a user of the working process 210, may identify one or more rights that the user has, and may identify the session that the user is logged into. In this case, the user of the working process 210 is logged into Session A.

Without adequate precautions, there is a chance that the target process 230 may be terminated, and that the working process 210 may issue a request to the service 220 to perform the action on the target process 230 before the working process 210 is aware that the target process 230 is terminated. In that case, another very different process may be started with the same process identifier as the target process 230. This might cause the requested action to be taken upon an unintended target process. To guard against this adverse consequence, upon receiving the request from the working process 210, the service 220 may open a reference to the process identifier associated with the target process 230. Should the target process 230 thereafter terminate, the open reference to the associated process identifier will prevent the operating system from assigning that same process identifier to a different process.

If the target process 230 is terminated before the requested action may be taken on the target process 230, the service 220 will report back to the working process 210 that the requested action has been terminated, and thus the action was not performed on the target process 230. The user of the working process 210 may then take appropriate action, such as reattempting the action the next time the target process 230 is initiated.

Assuming that the working process 230 is not terminated, however, the service 220 may alter the user token to change the session identifier associated with session A to a session identifier identifying the session B of the target process 230 (act 222). The altering of the session identifier of a user token is something that might not typically be permitted on any other session except the intermediary session 202. The service 220 also may use the user token to determine whether or not the user is authorized to cause the requested action to occur on the target process 230. If the user is authorized, the service 220 may then cause a proxy working process 231 associated with the identified action to be run in the second session B.

For instance, if the working process 210 was a diagnostic tool process, the proxy working process 231 may also be a diagnostics tool process. The proxy working process 231 is created by the service 220 causing the process to be initiated in the session B using the altered user token which reflects the identified user and having the altered session identified reflecting session B.

If the proxy working process 231 was a diagnostics tool process, the proxy working process may detect the request to attach to the target process 230 (act 232), detect the sessions of the proxy working process and the target process (act 233), which should be the same. If they are not the same (Yes in decision block 234) in which case the action would be a cross session action, then an error has occurred and the same is reported to the working process 210 (act 235). If the sessions are the same and thus the action is not performed cross sessions (No in decision block 234) as should be the case, the attachment may be performed in any manner conventional or otherwise, that is suitable for attachment of processes within the same session (act 236).

For example, if the proxy working process 231 were a proxy diagnostics tool process, the proxy diagnostics tool process 231 may cause diagnostics code to be run in the target process 230. The diagnostics process 231 may, for instance, run a remote thread in the target process 230 to thereby perform diagnostics on the target process. This altered form of remote threading is permissible since the proxy diagnostics tool process 231 and the target process 230 are in the same session. The diagnostics code gathers data regarding the performance of the target process 230 and reports the success or failure status of the diagnostics back to the service 220. The proxy diagnostics tool process 231 then terminates. Upon detecting that the proxy diagnostics tool process 231 has terminated, the service 220 reports the status back to the waiting original worker process 210.

Although methods have been described with respect to FIG. 2, the principles of the present invention extend to computer program product comprising one or more computer-readable media having thereon one or more computer-executable instructions that, when executed by one or more processors of the server computing system, cause the computing system to perform the methods of FIG. 2. For instance, referring to FIG. 1, memory 104 and communication channels 108 may represent examples of such computer-readable media. The memory 104 represents an example of physical computer-readable media in the form of physical storage and/or memory media. The principles of the present invention also extend to computing systems themselves that are configured through hardware, software, or a combination of hardware and software, to perform all of portions of the method of FIG. 2 and the associated description.

The method illustrated with respect to FIG. 2 may be repeated for multiple processes running in other sessions as well. Thus, in the case of a diagnostics tool, the working process 210 may evaluate performance of a many process spanning many sessions including the session A in which the working process 210 runs.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for performing diagnostics across windows operating system sessions in a computing system that has multiple sessions, the method comprising:

an act of a diagnostics tool process running in a first session of a windows operating system of the computing system determining that diagnostics are to be performed on a process running in a second session of the windows operating system;

an act of the diagnostics tool process opening a channel of communication with a service that is running in an intermediary session of the windows operating system;

an act of the diagnostics tool process providing a user token to the service, the user token including and identification of a user of the diagnostics tool process and an identification of the first session in which the diagnostics tool process is running;

an act of the service altering the user token to change the identification of the first session to an identification of the second session;

an act of the service creating a proxy diagnostics tool process in the second session using the altered user token;

an act of the diagnostics tool process instructing the proxy diagnostics tool process to inject diagnostics code causing diagnostics code to be run into the process running in the second session; and an act of the diagnostics tool process running in the first session gathering data from the diagnostics code running in the second session.

2. A method in accordance with claim 1, further comprising:

an act of the service opening a process identifier associated with the process running in the second session to prevent the windows operating system from assigning the process identifier to another process if the process terminates prior to the diagnostics code being run.

3. A method in accordance with claim 1, further comprising:

an act of the service determining that the user identified in the user token is authorized to inject diagnostics code into the process running in the second session.

4. A method in accordance with claim 1, wherein the act of a diagnostics tool process running in a first session determining that diagnostics are to be performed on a process running in a second session further comprises;

an act of the diagnostics tool process in the first session detecting a request to perform diagnostics on the process in the second session;

an act of the diagnostics tool process in the first session comparing a session identifier of the first session with a session identifier of the process in the second session; and an act of determining that the session identifier of the first session and the session identifier of the process in the second session are not the same.

5. A method in accordance with claim 1, further comprising:

an act of the service detecting that the diagnostics code injected into the process in the second session has terminated.

6. A method in accordance with claim 5, wherein the method further comprises:

in response to the detection that the diagnostics code injected into the process in the second session has terminated, an act of the service reporting to the diagnostics tool process running in the first session that the diagnostics of the process in the second session is complete.

7. A computer program product comprising one or more computer-readable storage media having thereon computer-executable instructions that, when executed by one or more processors of a computing system, cause the computing system to perform a method for a first process running in a first session to initiate a proxy process running in a second session, the method comprising:

an act of a first process running in a first session of an windows operating system determining that diagnostics are to be performed on a second process running in a second session of the windows operating system;

an act of the first process opening a channel of communication with a service that is running in an intermediary session of the windows operating system;

an act of the first process providing a user token to the service, the user token including and identification of a user of the first process and an identification of the first session in which the first process is running;

an act of the service altering the user token to change the identification of the first session to an identification of the second session;

an act of the service creating a proxy first process in the second session using the altered user token;

an act of the first process instructing the proxy first process to inject diagnostics code into the second process running in the second session; and an act of the first process running in the first session gathering data from the diagnostics code running in the second session.

8. A computer program product in accordance with claim 7, wherein the act of the first process running in a first session determining that diagnostics are to be performed on the second process running in a second session further comprises:

an act of the first process in the first session detecting a request to perform diagnostics on the second process in the second session;

an act of the first process in the first session comparing a session identifier of the first session with a session identifier of the second process in the second session; and an act of determining that the session identifier of the first session and the session identifier of the second process in the second session are not the same.

9. A computer program product in accordance with claim 7, the method further comprising:

an act of the service determining that the user identified in the user token is authorized to inject diagnostics code into the second process running in the second session.

10. A computer program product in accordance with claim 7, wherein the method further comprises:

an act of the service detecting that the diagnostics code injected into the second process in the second session has terminated.

11. A computer program product in accordance with claim 10, wherein the method further comprises:

in response to the detection that the diagnostics code injected into the second process in the second session has terminated, an act of the service reporting to the first process running in the first session that the diagnostics of the second process in the second session is complete.

12. A computer program product in accordance with claim 7, further comprising:

an act of the service opening a process identifier associated with the second process running in the second session to prevent the windows operating system from assigning the process identifier to another process if the second process terminates prior to the diagnostics code being run.

* * * * *